No. 774,680. Patented November 8, 1904.

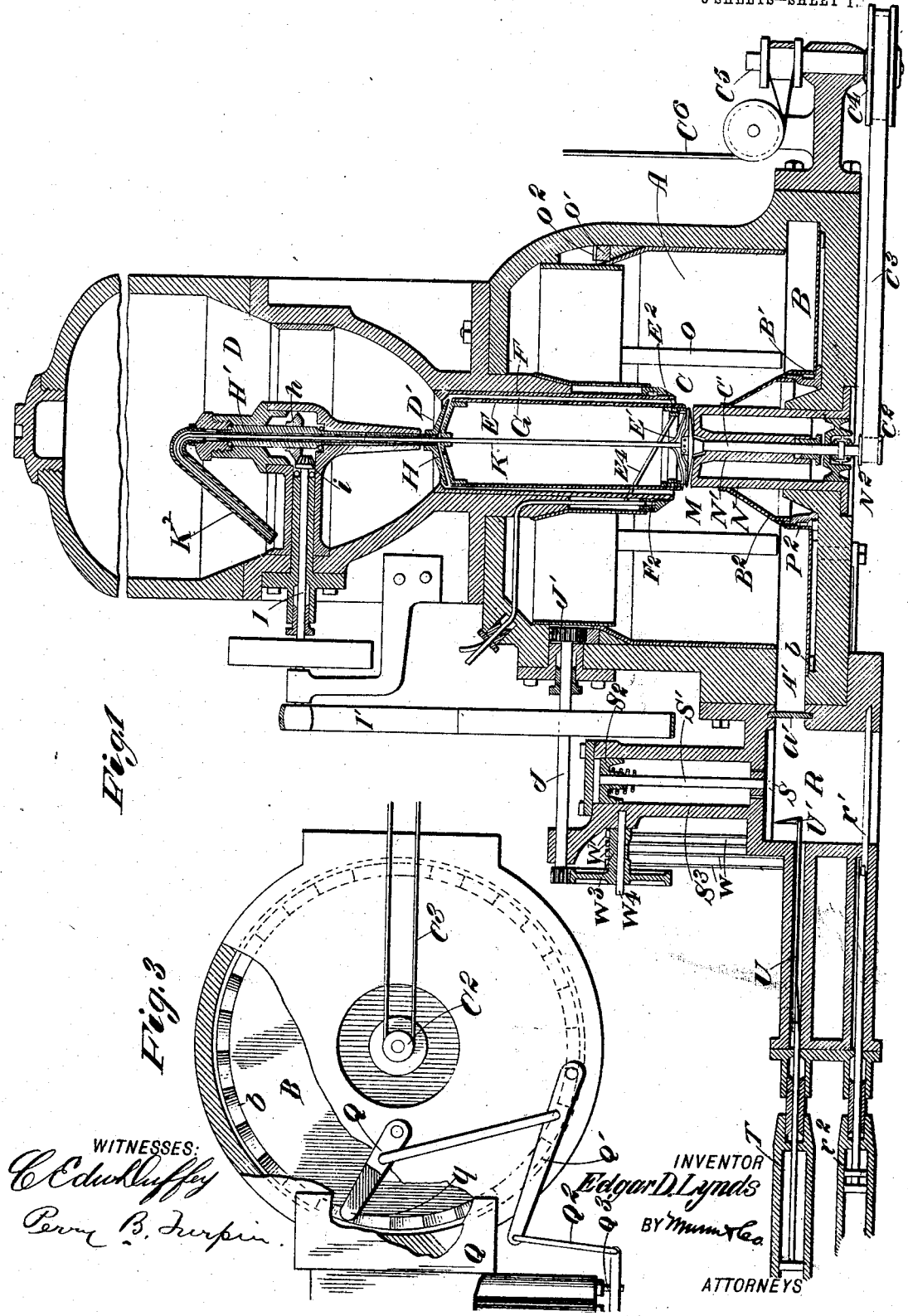

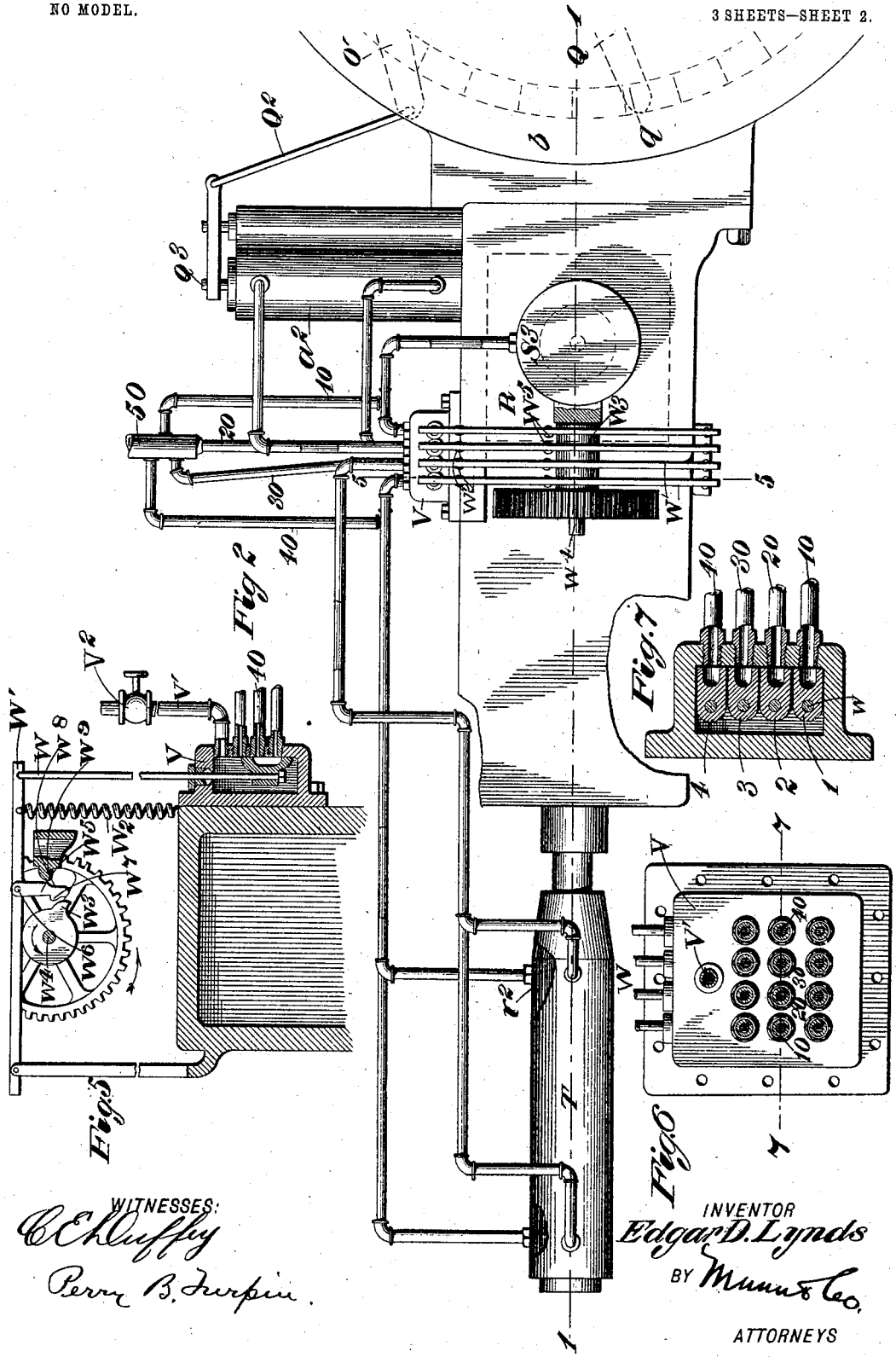

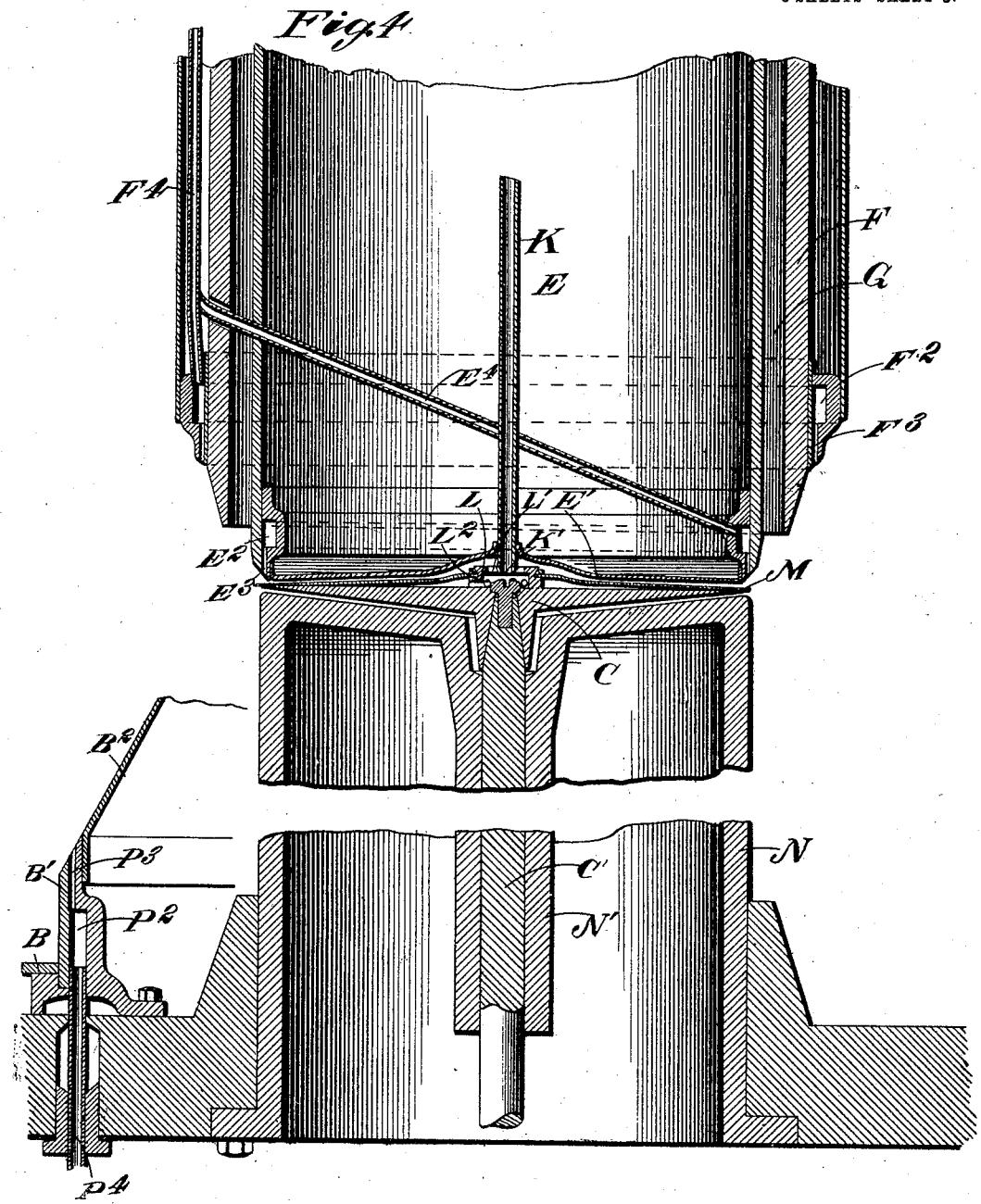

UNITED STATES PATENT OFFICE.

EDGAR D. LYNDS, OF NEWMAN, ILLINOIS.

BREAD-MAKING APPARATUS.

SPECIFICATION forming part of Letters Patent No. 774,680, dated November 8, 1904.

Application filed December 7, 1903. Serial No. 184,138. (No model.)

*To all whom it may concern:*

Be it known that I, EDGAR DAVID LYNDS, a citizen of the United States, and a resident of Newman, in the county of Douglas and State of Illinois, have made certain new and useful Improvements in Bread-Making Apparatus, of which the following is a specification.

My invention is an improvement in apparatus for use in making bread and the like; and the invention has for an object, among others, to provide a novel construction for mixing the flour and milk, water, or other liquid constituent through the aid of a rapidly-revolving disk, from which the liquid element will be discharged in a finely-divided state into the flour, and so thoroughly mixed with the flour in the mixing-chamber, as will be presently described.

The invention has for further objects other improvements; and it consists in certain novel constructions and combinations of parts, as will be hereinafter described and claimed.

In the drawings, Figure 1 is a vertical longitudinal section of the improved apparatus, on about line 1 1 of Fig. 2. Fig. 2 is a top plan view of a portion of the apparatus. Fig. 3 is a bottom plan view of a portion of the apparatus, illustrating the means for moving the receiving-table for the dough. Fig. 4 is an enlarged vertical longitudinal section, partly broken away, of the revolving disk and the parts immediately associated therewith. Fig. 5 is a detail section on about line 5 5 of Fig. 2. Fig. 6 is a face view of the valve-chest, and Fig. 7 is a detail cross-section of the valves and valve-chest on about line 7 7 of Fig. 6.

In carrying out my invention I provide a mixing-chamber A, a revolving table B at the base thereof, a rapidly-revolving disk C within the mixing-chamber and operating to discharge by centrifugal action the liquid constituents in a finely-divided state into the flour in the chamber A to form the dough upon the revolving table B, means being provided for clearing the walls of the mixing-chamber of the accumulation of dough, for removing the dough in suitable quantities from the revolving table from time to time, and for cooking the dough in the mixing-chamber; but it should be understood that the revolving disk for discharging and mixing the liquid constituents with the supplied flour is an important feature of my invention and that I do not desire to be limited in the broad features of this part of my invention to the supplemental or other parts used in connection with such broad features in the practical embodiment of my invention shown in the accompanying drawings.

In the construction shown the hopper D for the flour is mounted above the mixing-chamber A and is provided at its lower end with the large discharge-opening D', which communicates with the annular space between the drum E and the depending tubular discharge portion F, which projects downwardly from the lower end of the hopper D into the chamber A. This drum E is made sufficiently smaller than the internal diameter of the discharge-tube F to afford the annular space G between the drum and the discharge-tube, through which space the flour from the hopper D passes to the mixing-chamber, such annular discharge-space G opening at its lower end adjacent to the outer edge of and slightly above the revolving disk C in the construction as best shown in Figs. 1 and 4 of the drawings.

To afford a constant and even flow of flour through the space G, I provide the agitator-disk H, which turning at about two hundred revolutions per minute operates in the discharge-opening D' of the flour-hopper and is revolved at a comparatively slow speed, as suggested, by any suitable construction. It may be that shown in Fig. 1, which includes a bevel-gear $h$ on the shaft H' of the disk H, which gear $h$ is meshed by a pinion $i$ on a shaft I, which is geared by a belt I' with the shaft J, as shown in Fig. 1. The shaft H' is made hollow and receives the feed-pipe K for water, milk, or any other liquid constituent, which feed-pipe passes down through the shaft H', thence centrally through the drum E, and through the bottom plate E' of said drum E and has its lower open end K' extending within the open upper end L' of a perforated distributer L, arranged at the center of the cover-plate M, as shown in Fig. 4 of the drawings. This distributer L is provided with numerous lateral outlets L², through which the liquid discharges to the space between the cover-plate M and the disk C, the said cover-plate being secured to the disk C, so that it will be revolved rapidly thereby. It will be understood that I prefer to employ this cover-plate M, as thereby the water and the like are confined to the upper surface of the disk C and are caused to be discharged by the rapid revolution of said disk; but it will be understood that I do not desire to be confined to the use of this cover-plate, as it may be omitted in some instances. I prefer, however, to employ the cover-plate and to arrange it to project slightly at its outer edge beyond the outer edge of the disk C, so that the liquid constituents will be discharged rapidly from the outer edge of the cover-plate by the rapid revolution of the disk and said cover-plate in the use of the invention. It will be understood from the foregoing that the flour and liquid elements will be supplied the flour through the annular chamber G and the liquid directly from the disk and cover-plate, so that the flour and said liquid constituents will be mixed thoroughly, and when in a finely-divided condition will be discharged in the form of dough on the revolving table B, which latter will be operated by the means presently described.

In starting the operation air-pressure is supplied to the flour-hopper D, and this pressure is supplied continuously in the operation of the invention in order to aerate the flour as it passes down through the passage G, and thus aid in lightening the dough, as well as preventing the passage of steam upward through the said passage in the operation of mixing the dough. As shown and as preferred, I supply the air through a pipe K², which surrounds the liquid-supply pipe K and discharges, surrounding said pipe, to the upper end of the hollow shaft H', and the air passes out through said pipe H' and discharges immediately below the agitator H, as will be understood from Fig. 1 of the drawings.

The disk C has its shaft C' journaled in the central tubular portion N' of a stand N, above which the disk revolves, the said shaft C' having suitable roller-bearings at N² at the lower end of the stand N and being provided below said roller-bearings with a pulley C², connected by a belt C³ with a pulley C⁴ on a counter-shaft C⁵, driven by a belt C⁶; but it will be understood that the shaft C' may be driven in any other suitable manner, it being desirable to give the said shaft and disk a rapid revolution, and in the practical use of the invention the said shaft may be revolved probably about as high as thirty thousand revolutions a minute in order to secure an efficient discharge of the liquid constituents and the mixing thereof with the flour in the use of the invention.

The table B is provided at its inner edge with an upright plate B', to which the dough will be delivered by the deflector-cone B², which latter encircles a stand N and inclines downwardly from a point slightly below the upper end of said stand, as best shown in Fig. 1 of the drawings.

In order to clear the inner walls of the mixing-chamber A, I provide scrapers O, which extend longitudinally along and in close proximity to the walls of said chamber and are secured at their upper ends to a carrier-ring O', having teeth O², which are meshed by a pinion J' on the shaft J, so the said carrier-ring will be revolved in such manner as to cause its scraper-blades O to clear the sides of the mixing-chamber in the operation of the invention.

It becomes desirable to cook the dough in the mixing-chamber and also to provide means for preventing any clogging of the flour and liquid constituent at the discharge edge of the disk and its cover-plate, as well as to cause the liquid and flour to be brought together more rapidly and mixed more thoroughly. To this end I provide means for introducing steam and which I will now describe.

Near its lower end the drum E is provided with an annular chamber E², from which a discharge slit or opening E³ leads to the lower edge of the drum and discharges adjacent to the outer edge of the cover-plate, steam being supplied to the chamber E² through a pipe E⁴ from any suitable source of supply. The steam discharged from the opening E³ operates in a measure to cook the dough immediately at its discharge and also prevents any clogging at the outer edge of the disk. I also provide an annular steam-chamber F² near the lower end of the discharge-tube F, said chamber F² having a downwardly-opening discharge slit or opening F³, through which steam is discharged onto the dough as it is formed by the discharge of flour and liquid elements, as before described. Steam is supplied to the chamber F² by a steam-pipe F⁴, (see Figs. 1 and 4,) leading from any suitable source of supply. I also provide a steam-chamber P² immediately within the upwardly-projecting plate B' at the inner edge of the revolving table B, said chamber P² having an upwardly-opening discharge slit or opening P³ and being supplied with steam through a pipe P⁴, as shown in Fig. 4 of the drawings.

The discharge of steam at P³ aids in cooking the dough and also prevents the same from accumulating in too large a quantity on the deflector-plate B², counteracting in a measure the tendency of the dough to accumulate on said plate by reason of the discharge of the steam at F³, as before described.

For turning the table B, I employ a mechanism including a ratchet-ring $b$ on the under side of said plate, which is engaged by a pawl $q$ at the outer end of the swinging arm Q, which is caused to oscillate by any suitable connection with a moving part of the apparatus. As shown, I connect this arm Q with a swinging arm Q', which is operated by a link Q² from the piston-rod Q³ on cylinder a², one of the cylinders presently described.

An outlet-opening A' leads from the lower end of the chamber A directly above the table B and opens into a loaf-receiving chamber R, the outlet-opening A' being controlled by a slide a' and the loaf-chamber R being controlled at its lower end by a slide r', such slides a' and r' being operated from pistons in cylinders a² and r², as shown in Figs. 1 and 2 of the drawings. I also employ a head S for discharging the loaf from the chamber R, said head S being operated by the rod S' from a piston S² in a cylinder S³. I also provide a cylinder T having its piston-rod connected with a delivery-slide U, which operates through the discharge-opening A' and above the revolving table and by means of a blade U' at the free end of said delivery-slide cuts from the layer of dough on the table B a slice of the desired size and as said slide U is retracted discharges the said quantity of dough into the chamber R, from the lower end of which it is ejected by the head S in the operation of the invention, as will be more fully described.

In the operation of the invention, the dough having accumulated in a sufficient quantity upon the table B and the parts being in the position shown in Fig. 1, the slide a' will be opened, the delivery-slide U will be advanced to operate above the table B and cut a slice of dough therefrom, and then will be rapidly withdrawn with the slice of dough and deliver the same to the chamber R. The slide a' will then be closed, the slide r' will be quickly opened, and the head S will be operated to eject the loaf quantity of dough from the chamber R, after which the cooking of the dough may be completed, if desired, in any suitable form of bake-oven. Manifestly the operations of the slides a' and r' and U and of the head S may be secured in any suitable manner; but I prefer to control them from a common valve-chest and by the means which I will now describe. In suitable position on the framing and preferably along the outer side of the loaf-chamber R, I secure the valve-chest V, to which steam or other suitable power may be delivered from a supply-pipe V' and controlled by any suitable throttle-valve V², as indicated in Fig. 5. In this valve-chest V are arranged the valves 1, 2, 3, and 4 for respectively the cylinder S³, the cylinder a², the cylinder T, and the cylinder r², as will be understood from Fig. 2 of the drawings. These valves are alike and are similar in general respects to an ordinary slide-valve of a steam-engine, so the operation thereof need not be described in detail, it being shown in Figs. 2, 5, 6, and 7 that the valves operate to deliver live steam alternately to the opposite ends of their respective cylinders and to exhaust the steam in turn from the opposite ends of their respective cylinders, it being preferred in practice to open the several exhaust-pipes 10, 20, 30, and 40 of respectively the valves 1, 2, 3, and 4 into a common exhaust-offtake 50, as will be understood from Fig. 2 of the drawings. It being desirable to operate the slide-valves quickly, I provide for each of said parts 1, 2, 3, and 4 an operating construction which is best shown in Fig. 5 and includes a rod W, connected at one end with the slide-valve and at its other end with the moving end of a lever W', which is actuated in one direction by a spring W² and in the other direction by a cam projection W³ on a shaft W⁴, which is driven by suitable gearing with the shaft J, as shown in Fig. 1. The lever W' is provided with a swinging hanger W⁵, pivoted at W⁶ to the lever W' and having on one side next the cam W³ a downwardly-facing rounded shoulder W⁷ for engagement by the cam projection W³ and on its rear side a rounded downwardly-facing shoulder W⁸ to rest upon a rounded abutment W⁹, secured to the framing. In the operation of this construction as the cam is moved in the direction of the arrow in Fig. 5 it will by engaging with the shoulder W⁷ of the hanger W⁶ lift said part W⁵ and the lever W' until the rounded shoulder W⁸ rests upon the rounded surface W⁹, on which it will be held until the cam W³ escapes from the rounded surface W⁷, when the hanger W⁵ will slip off the abutment W⁹ and permit the readjustment of the lever to the position shown in Fig. 5 by the action of the spring W², as will be understood from said Fig. 5. The several cams W³ being properly set upon the shaft W⁴ will as the operation proceeds move their respective valves in such manner as to secure the successive operation of the cut-off slides, the loaf-delivering slide, and the ejecting-head, as before described.

In practice I prefer to make the disk C of aluminium, such material being non-corrosive and also having sufficient spring to aid in its running true at a high speed.

In operation the apparatus will work under considerable internal pressure—that is to say, steam-pressure within the mixing-chamber—in order to cook the dough. To prevent any considerable loss of pressure in discharging the loaves or sections from the revolving table, I arrange the slides a' and r' so that the slide r' will always be closed when the slide a' is open.

Having thus described my invention, what I claim as new, and desire to secure by Letters Patent, is—

1. An apparatus substantially as herein described comprising a mixing-chamber having an outlet-opening and a revolving table moving in line with said opening, a disk revolving rapidly and discharging at its outer edge into the mixing-chamber, means for supplying liquid to said disk whereby it may be discharged therefrom by centrifugal action, means for discharging flour to the mixing-chamber adjacent to the outer edge of the revolving disk, a loaf-receiving chamber adjacent to the mixing-chamber and communicating therewith through the discharge-opening, a cut-off for controlling such discharge-opening, a cut-off controlling the outlet end of the loaf-receiving chamber, a delivery-slide operating across the loaf-receiving chamber and through the discharge-opening into the mixing-chamber above the revolving table, an ejector operating in the loaf-receiving chamber, means for operating the cut-off slides, the delivery-slide and the ejector and means for admitting steam to the mixing-chamber substantially as and for the purpose set forth.

2. In a bread-making apparatus the combination of the mixing-chamber, a revolving disk therein, means for delivering liquid to said disk whereby it may be discharged therefrom by centrifugal action and means for delivering flour adjacent to the outer edge of said disk substantially as set forth.

3. The combination in a bread-making apparatus with the mixing-chamber of a disk operating therein, means for rapidly revolving said disk, means for delivering liquid to said disk, flour-feeding devices and means for admitting steam into the mixing-chamber.

4. In a bread-making apparatus the combination of a disk for discharging liquid in a finely-divided state, means for rapidly revolving said disk, means for supplying liquid to the said disk and means for supplying flour to mix with the finely-divided liquid discharged from the disk substantially as set forth.

5. The combination in a bread-making apparatus of a disk, means for supplying liquid to the disk, means for rapidly revolving the disk and means for supplying flour above and adjacent to the outer edge of the disk substantially as set forth.

6. The combination in a bread-making apparatus with the disk, means for supplying liquid to the disk and means for rapidly revolving the disk, of means for supplying flour adjacent to the outer edge of the disk, a chamber within which the disk operates, and means for admitting steam into said chamber substantially as set forth.

7. The combination of the mixing-chamber, the loaf-receiving chamber communicating with the mixing-chamber, means controlling communication between the said chambers, means controlling the discharge from the loaf-receiving chamber, an ejector operating in the loaf-receiving chamber and delivery devices for transferring a portion of the dough from the mixing-chamber to the loaf-receiving chamber substantially as set forth.

8. The combination in a bread-making apparatus with the mixing-chamber and the loaf-receiving chamber communicating therewith of a slide controlling connection between the mixing and loaf-receiving chambers, a slide controlling the discharge from the loaf-receiving chamber, delivery devices for transferring a portion of the dough from the mixing to the receiving chamber, steam cylinders and pistons for operating said slides and delivery and ejecting devices, and valve mechanism controlling the delivery of steam to the several cylinders substantially as set forth.

9. The combination in a bread-making apparatus with the mixing-chamber and a revolving table on which the dough is formed, of delivery devices for removing portions of the dough from the said table substantially as set forth.

10. The combination with the mixing-chamber and the revolving table therein, of the disk operating in said chamber above the revolving table, means for rapidly revolving said disk, means for supplying flour adjacent to the outer edge of the disk, means for supplying liquid to the disk, and delivery devices for removing portions of the dough from the revolving table substantially as set forth.

11. The combination of the mixing-chamber, the scrapers operating along the walls of said chamber, means for operating the scrapers, the disk within said chamber and means for supplying liquid to the disk, means for rapidly revolving the disk and means for supplying flour adjacent to the outer edge of the disk substantially as and for the purposes set forth.

12. The combination of the mixing-chamber, the disk therein, means for rapidly revolving said disk, means for supplying liquid to the disk, means for supplying flour adjacent to the outer edge of the disk, and means for delivering steam between the outer edge of the disk and the discharge of the flour-delivery substantially as set forth.

13. The combination of the mixing-chamber, the disk therein, means for rapidly revolving the disk, means for supplying liquid to the disk, means for discharging steam into the mixing-chamber and means for delivering flour between said steam-discharge and the outer edge of the disk substantially as set forth.

14. The combination of the mixing-chamber, the disk operating therein, means for supplying liquid to the disk, means for rapidly revolving the disk, means for delivering steam adjacent to the outer edge of the disk, means for delivering flour outside the said steam-discharge whereby the latter will be between the flour-delivery and the disk and means for discharging steam outside the flour-delivery substantially as set forth, 15. The combination of the mixing-chamber, the disk operating therein, means for supplying liquid to the disk, means for rapidly revolving the disk, inner and outer steam-discharges above and concentric with the disk and devices for delivering flour between said inner and outer steam-discharges substantially as set forth.

16. The combination of the mixing-chamber, the disk operating therein, means for delivering liquid to the disk, means for rapidly revolving the disk, means for delivering flour adjacent to the outer edge of the disk, the steam-discharging devices adjacent to the outer edge of the disk, and a lower steam-discharge below the said disk substantially as set forth.

17. The combination in a bread-making apparatus of the disk, means for supplying liquid to the disk, means for rapidly revolving the disk and means for delivering flour in approximately an annular supply adjacent to the outer edge of the disk substantially as set forth.

18. A bread-making apparatus comprising a disk for delivering liquid by centrifugal action, and a cover-plate above and turning with said disk and free at its outer edge from the said disk whereby the liquid may be discharged in a finely-divided state between the said disk and cover-plate.

19. A bread-making apparatus comprising a disk, a cover-plate above and turning with the disk and a perforated distributer at the center of said plate and adapted to receive the liquid supplied to the disk substantially as set forth.

20. The combination in a bread-making apparatus with means for delivering flour in approximately an annular stream and means for discharging liquid in a finely-divided state to such supply of flour from within the annular stream substantially as set forth.

21. The combination of the mixing-chamber, means for supplying flour thereto in a finely-divided state, means for discharging liquid in a finely-divided state to the flour within the mixing-chamber and means for admitting steam to the mixing-chamber to cook the dough so formed substantially as set forth.

22. The combination of a mixing-chamber, means for mixing the flour and liquid in said chamber to form a dough and means for cooking the dough in the mixing-chamber substantially as set forth.

23. The combination of a mixing-chamber, means for supplying flour to said chamber and means for delivering the liquid by centrifugal action in a finely-divided state to the flour to form a dough substantially as set forth.

24. The combination in a bread-making apparatus of the mixing-chamber means for supplying flour to said chamber means for discharging liquid by centrifugal action in a finely-divided state to said flour, means for clearing the walls of said mixing-chamber, means for removing the dough in desired quantities from time to time from the mixing-chamber, and means for cooking the dough in the mixing-chamber substantially as set forth.

25. The combination in a bread-making apparatus of the mixing-chamber, the flour-hopper above the mixing-chamber having a discharge at its lower end to the mixing-chamber, an agitator-disk in the base of the flour-hopper, and means in the mixing-chamber for supplying liquid by centrifugal action in a finely-divided state to the flour delivered from the hopper substantially as set forth.

26. The combination of the mixing-chamber the flour-hopper above the mixing-chamber, the tubular discharge portion depending from the flour-hopper into the mixing-chamber, a drum in said tubular discharge portion and sufficiently smaller than the same to afford an annular discharge-space for the flour between the tube and drum, the disk below said drum and concentric with the annular flour-discharge space, means for supplying liquid to the said disk and means for rapidly revolving the disk substantially as set forth.

27. The combination of the mixing-chamber, the tube depending therein and provided near its lower end with an annular steam-space having a downwardly-opening discharge-slit, means for supplying steam to said space, the drum fitting within said tube and spaced therefrom to form the annular discharge-space, said drum being provided near its lower end with an annular steam-space having a downwardly-opening discharge-slit, means for supplying steam to the annular steam-space of the drum, the disk below the drum, means for supplying liquid to the disk and means for revolving the disk substantially as set forth.

28. The combination of the mixing-chamber, the disk operating therein, means for supplying liquid to the disk, means for rapidly revolving the disk, means for discharging steam downwardly above the disk, means for discharging steam upwardly below the disk and means for supplying flour adjacent to the outer edge of the disk substantially as set forth.

29. A bread-making apparatus comprising a mixing-chamber, a loaf-receiving chamber delivery and cut-off devices operating in connection with the said loaf-receiving chamber, cylinders and pistons for operating said cut-off and delivery devices, a series of valves controlling the supply of steam to the several cylinders, a steam-chest in which the series of valves operate and means for operating the valves substantially as set forth.

30. In a bread-making apparatus the combination with the mixing-chamber and the flour-hopper of means for introducing liquid and flour to the mixing-chamber, means for establishing pressure in the mixing-chamber and means for establishing pressure in the flour-hopper substantially as described.

31. The combination with the mixing-chamber and means for introducing flour therein of means for discharging liquid in a finely-divided state to the flour in the mixing-chamber and means independent of the liquid-discharging means for introducing air in connection with the flour substantially as described.

32. The combination with the mixing-chamber and the flour-hopper, of an agitator at the base of the flour-hopper and means for introducing air adjacent to the said agitator and means for discharging liquid below said air-introducing means substantially as set forth.

33. A bread-making apparatus comprising a mixing-chamber closed, whereby pressure may be established therein, means whereby flour and liquid constituents may be mixed in said chamber, and means for admitting steam to the said closed mixing-chamber whereby to cook the bread, substantially as set forth.

34. A bread-making apparatus comprising a mixing-chamber, a disk therein, means for rapidly revolving said disk, whereby to cause it to discharge by centrifugal action in a finely-divided condition, liquid supplied to said disk, substantially as set forth.

35. The combination in a bread-making apparatus with an atomizing-disk, means for rapidly revolving said disk, and means for supplying liquid to said disk, of a flour-delivering means adapted to deliver flour in approximately an annular stream surrounding the annular disk, substantially as set forth.

EDGAR D. LYNDS.

Witnesses:
SOLON C. KEMON,
PERRY B. TURPIN.